United States Patent [19]

Garcia Pastor et al.

[11] Patent Number: 5,107,132

[45] Date of Patent: Apr. 21, 1992

[54] APPARATUS FOR THE VERIFICATION OF CORRECTED SURFACES OR IN THE PROCESS OF CORRECTION

[75] Inventors: Daniel Garcia Pastor; Francisco Garcia Pastor, both of Bunol; Antonio Gonzalez-Mataix Perez, Valencia, all of Spain

[73] Assignees: Daniel Garcia Pastor; Francisco Garcia Pastor, Bunol, Spain

[21] Appl. No.: 557,998

[22] Filed: Jul. 25, 1990

[30] Foreign Application Priority Data

Jul. 28, 1989 [ES] Spain ................................ 8902692

[51] Int. Cl.[5] ...................... G01N 21/86; G01V 9/04
[52] U.S. Cl. ...................... 250/560; 356/376
[58] Field of Search ............ 250/560, 561; 33/1 M; 356/376, 355, 356, 358, 357, 4, 4.5

[56] References Cited

U.S. PATENT DOCUMENTS

| | | | |
|---|---|---|---|
| 4,155,173 | 5/1979 | Sprandel | 33/174 |
| 4,610,089 | 9/1986 | Bell et al. | 33/1 M |
| 4,743,770 | 5/1988 | Lee | 250/560 |
| 4,850,712 | 7/1989 | Abshire | 356/376 |
| 4,928,396 | 5/1990 | Raleigh | 33/503 |
| 4,997,274 | 3/1991 | Takakusagi et al. | 356/72 |

*Primary Examiner*—David C. Nelms
*Assistant Examiner*—John R. Lee
*Attorney, Agent, or Firm*—Darby & Darby

[57] ABSTRACT

An apparatus for verification of corrected surfaces or surfaces being corrected includes a carriage displaceable on an horizontal alignment and displacement guide supported on two vertical supports, a proximity gage mounted on an extendable arm of the carriage, and a collimated laser-transmitter mounted on one of the two supports and cooperating with a multiple sensor screen mounted on the carriage. The proximity gage measures the distance between the proximity forming part thereof and a correct surface, and the laser-transmitter measures the distance from the one support to the carriage. A control system processes the measuring data and generates a graphic representation of the processed data.

1 Claim, 5 Drawing Sheets

1

APPARATUS FOR THE VERIFICATION OF CORRECTED SURFACES OR IN THE PROCESS OF CORRECTION

OBJECT OF THE INVENTION

The object of the invention is defined as an apparatus for the verification of corrected surfaces or in the process of correction, which can be coupled to commercial equipment.

It is applicable in the verification or analysis of straight, flat, cylindric surfaces, irregular or other surfaces, as long as they require a high degree of precision.

BACKGROUND OF THE INVENTION

The prior art for the verification of surfaces is based fundamentally on the comparison technique, by means of a feeler system which using a foreseen surface as a base points out the differences on the compared surface.

Mechanically the feeler is the organ of the copying machines which consists of a rod which slides over the surface of the piece that serves as the mold.

This feeler system is especially applicable in the reproduction of certain pieces, generally of small dimensions. It is not applicable to the verification of surfaces in large-sized pieces.

DESCRIPTION OF THE INVENTION

The moveable equipment which the invention refers to solves the problem of verification of corrected surfaces or in the process of correction with a tolerance of + 0.01 mm.

The error correction system by deformations of guides, supports and others is obtained by means of a displacement and alignment reading system by collimated laser and a two axes sensor screen.

The equipment is composed of the following parts:

Two vertical supports which support the alignment and displacement guide of the carriage.

Self-supporting carriage

Laser proximity reader-interpreter

Extendible arm in which the laser proximity reader-interpreter is located

Collimated laser transmitter and two axes coordinate interpretation screen

Electronic system for centralized control of the functions of the system, as well as for the processing of the obtained data Alphanumeric screen for data display Data printer

DESCRIPTION OF A PREFERRED EMBODIMENT

Figure 1:
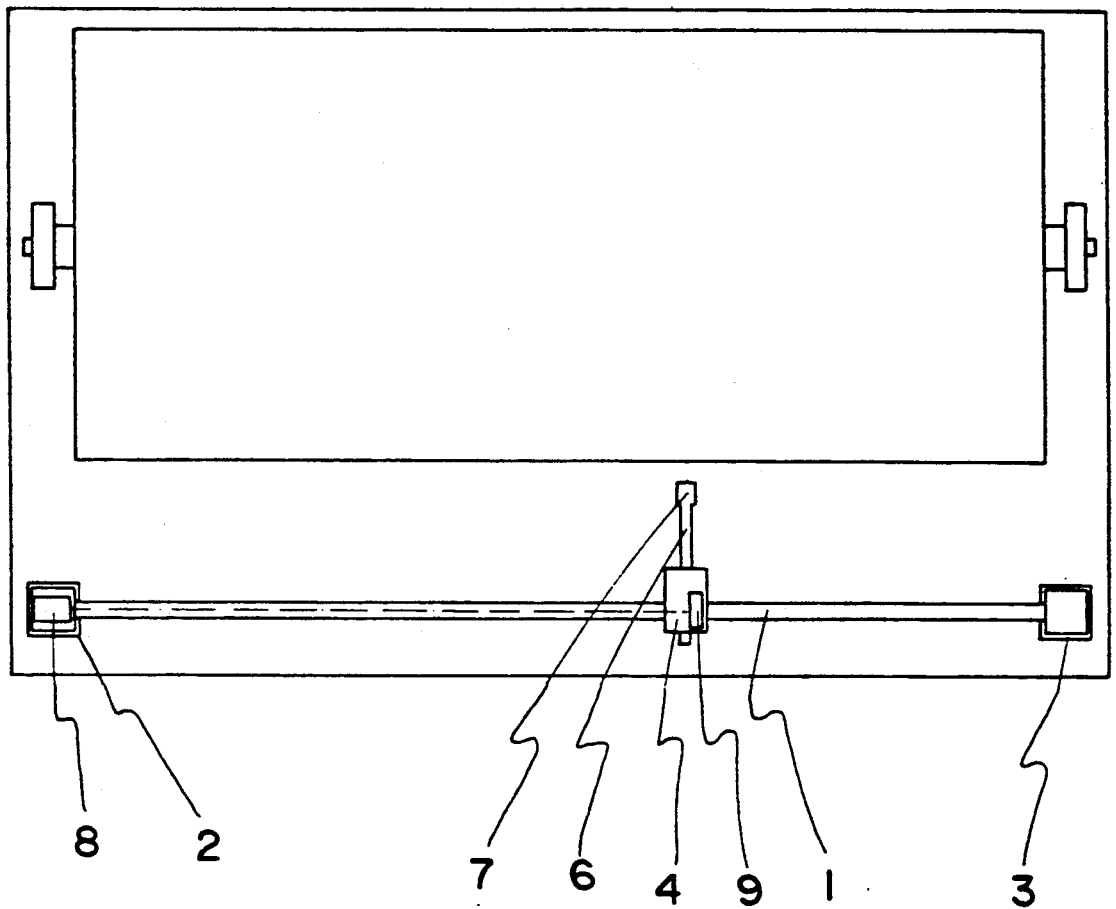
FIG. 1. Plan view the equipment mounted ready to verify the surface of a cylinder and nest to it the electronic control console.
Figure 2:
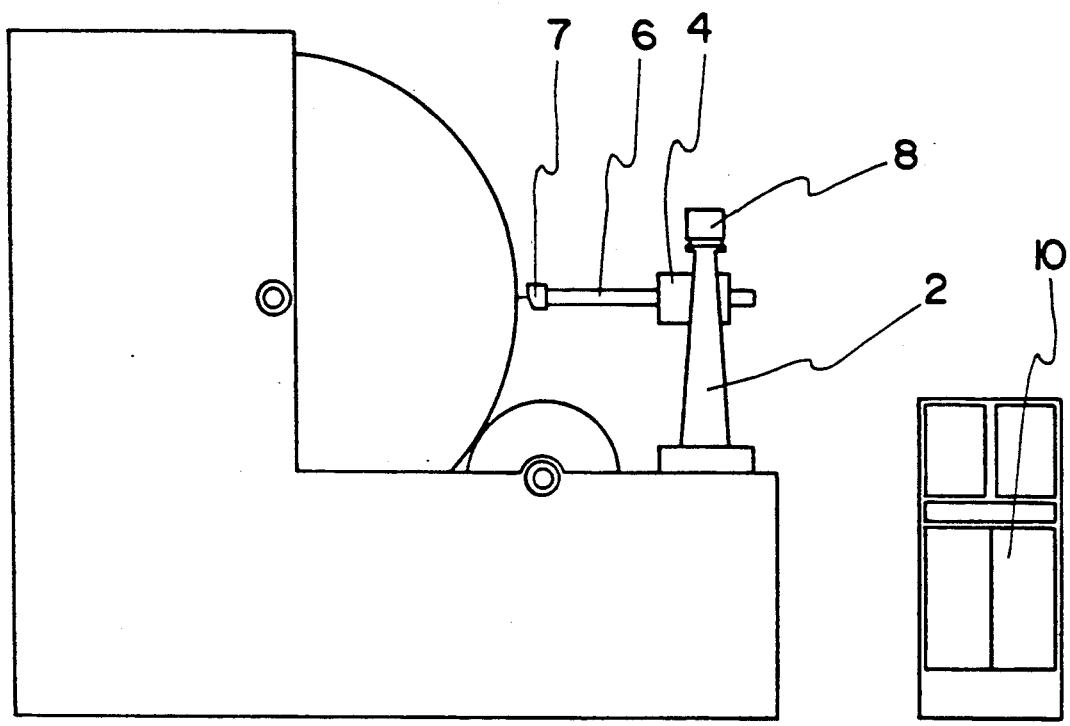
FIG. 2. Side view of the equipment ready to verify the surface of a cylinder.
Figure 3:
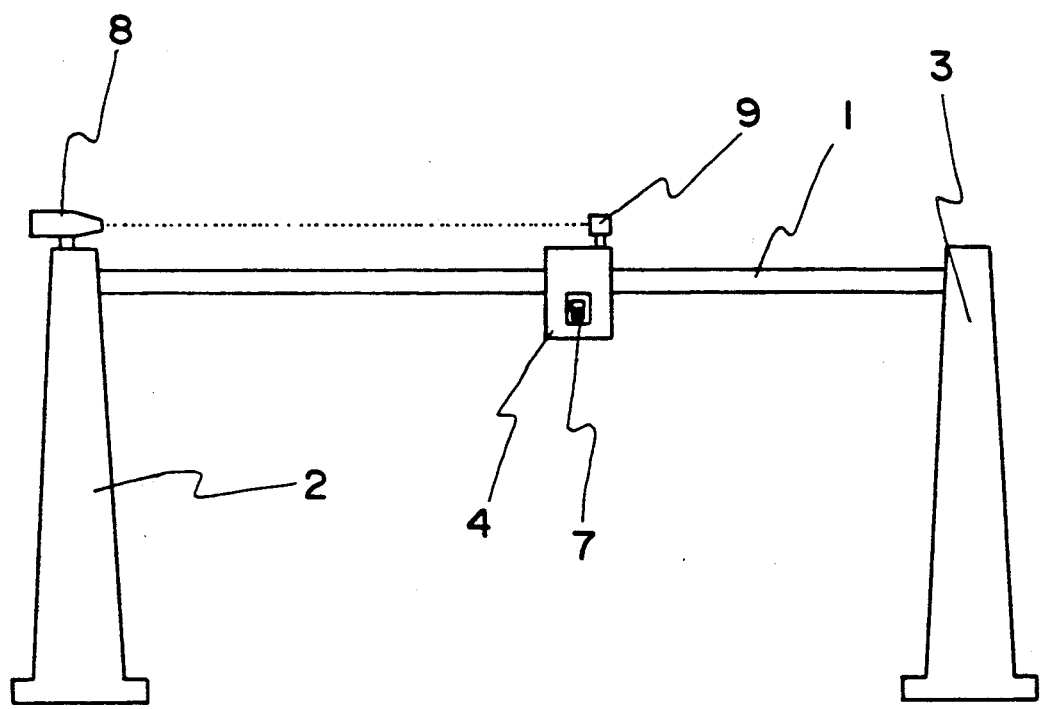
FIG. 3. Front elevational view of the equipment.

According to the cited drawings, one can see the main alignment and displacement guide (1) mounted on two vertical supports (2) and (3) above the surface to be measured and which permits the displacement of the carriage (4) along the main guide.

The carriage (4) displacement as well as its positioning are controlled by the central electronic system (10) by means of the optical positioning reading effected by a proximity gage (7) and a collimated laser (8).

On the carriage (4) there is an extendible arm (6) at the end of which there is the proximity gage (7) that measures the distance between a proximiter thereof located on the carriage (4) and a surface to be measured. The collimated laser (8) measures the distance between the carriage (4) and one of the supports (2) as well as any deviation of the carriage (4) relative to the support which may appear as a result of gravity or expansion of the main guide (1). This same arm will include a collapsible stop for the adjustment of measurement margins.

On one of the vertical supports (2) and on the carriage (4) there are, respectively, the collimated laser transmitter (8) and the multiple sensor screen (9) for the progressive determination of position, according to two axes.

With the data provided by the readers, the central electronic system (10) will compose the analytical representation of the surface.

For the making of the measurements a compensated distance determination method is used. For the implementation of this method we use a micrometric distance gage by commercial laser and an optical deviation analyzer controlled by the central electronic system.

The optical deviation analyzer, which includes the collimated laser and the two-axes sensor screen informs on possible errors caused by the guide as discussed above. Thereby, being known, errors of the distance to a reference point and the deviation may be compensated for, and an exact measurement of the condition of the analyzed surface can be obtained.

The correction is electronic and not mechanical. Determining the distance regarding a common reference for all the points, we will obtain a precise measurement of the defects or variations existing in the analyzed surface.

The proximeter (7) provides us with high precision the separation between the latter and the surface to be analyzed.

In this way we eliminate the influence that the inevitable displacements by gravity, expansion, etc. that the assembly which supports the measuring system would have on the measurement.

The measurements provided by the proximity gage (7) and the collimated laser transmitter (8) are supplied to the electronic system, in which the pertinent compensation is carried out, once the magnitudes obtained have been evaluated. Both systems have their results in the form of electric signals, therefore, in the first place, the adequate conversion of standards between those of the signals and the ones needed to effect the compensation must be carried out. For the purpose of establishing it, the correction corresponding to the obtained distance measurement in all the points in which we make evaluations.

This group of points is determined by the resolution of the commercial distance gage and by the rapidity with which the electronic system is capable of effecting the compensation.

Progressive determination of a position is effected by the proximity gage (7) and the collimated laser-transmitter (8). The position is determined on two axes, namely, a first axis on the guide (1) and a second axis in direction of the extendable arms (6) on which the proximity gage (7) is located.

Displacement in direction of the first axis is controlled by the laser transmitter (8), the distance measuring device. For each position leap in direction of the first axis, the proximity gage gives a measurement in direction of the second axis (distance between the same and the surface to be analyzed).

Thereby progressive position determination on this axis is made. Providing two independent measuring elements, the proximity gage (7) and the collimated laser (8), the measurement of which are processed in the central control unit, permits to obtain results of great precision.

The system includes an auxiliary, a numerical control system to facilitate the obtained information to the operator, though this is not thorough. By means of the same, one is also informed if the preliminary verification of the system has given rise to some type of error that could not be automatically corrected, therefore, leaving the measurements made afterwards invalid.

Likewise and for the purpose of being able to display the results in detail, or else, for the purpose of providing the information gathered about the defects observed in the controlled surface to another system in charge of correcting time, this electronic system stores the information obtained for each point in the memory, and permits the transfer to data processing or graphic representation equipment.

Figure 4:
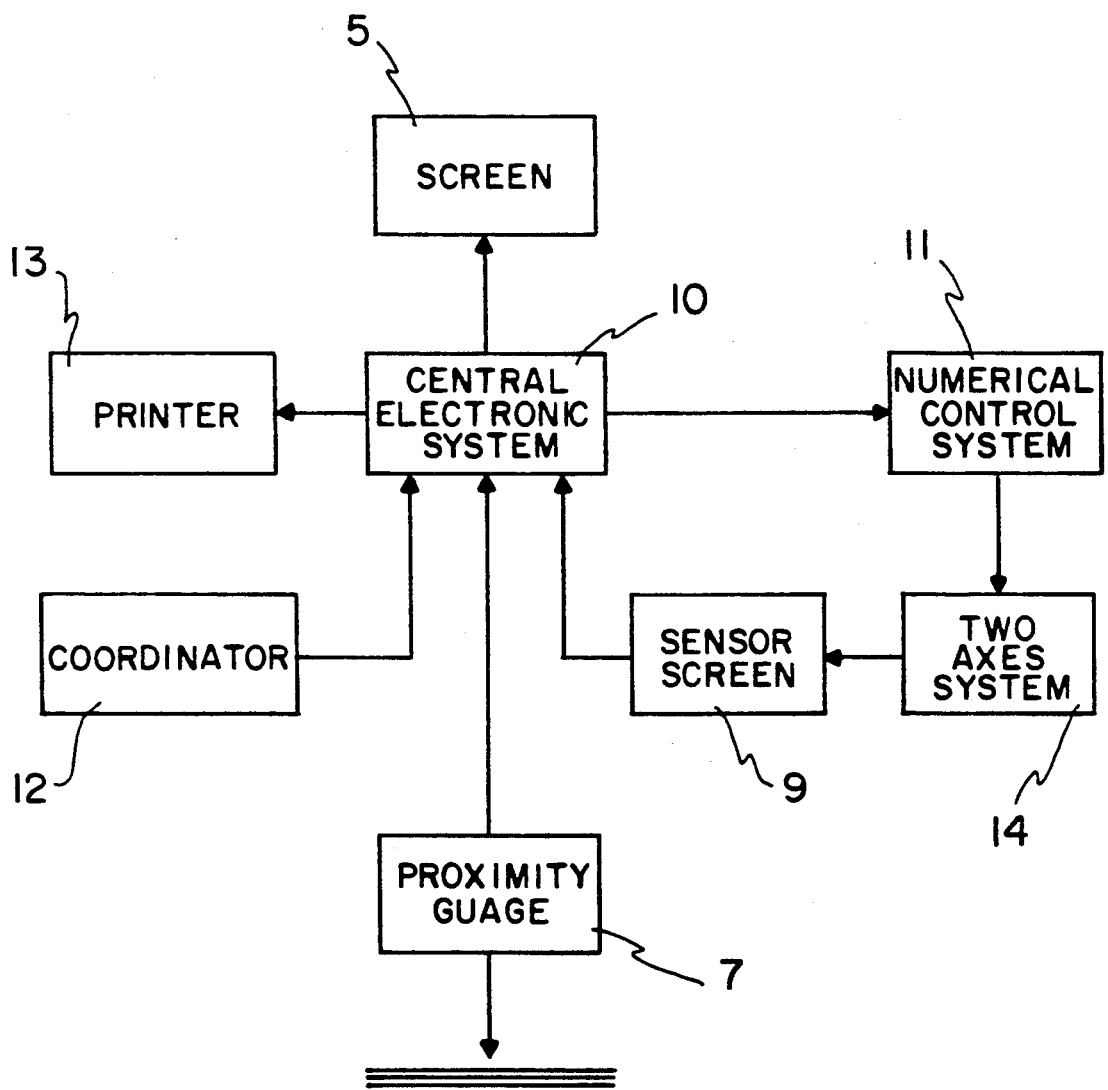
FIG. 4. Block diagram elements of the equipment.
Figure 5:
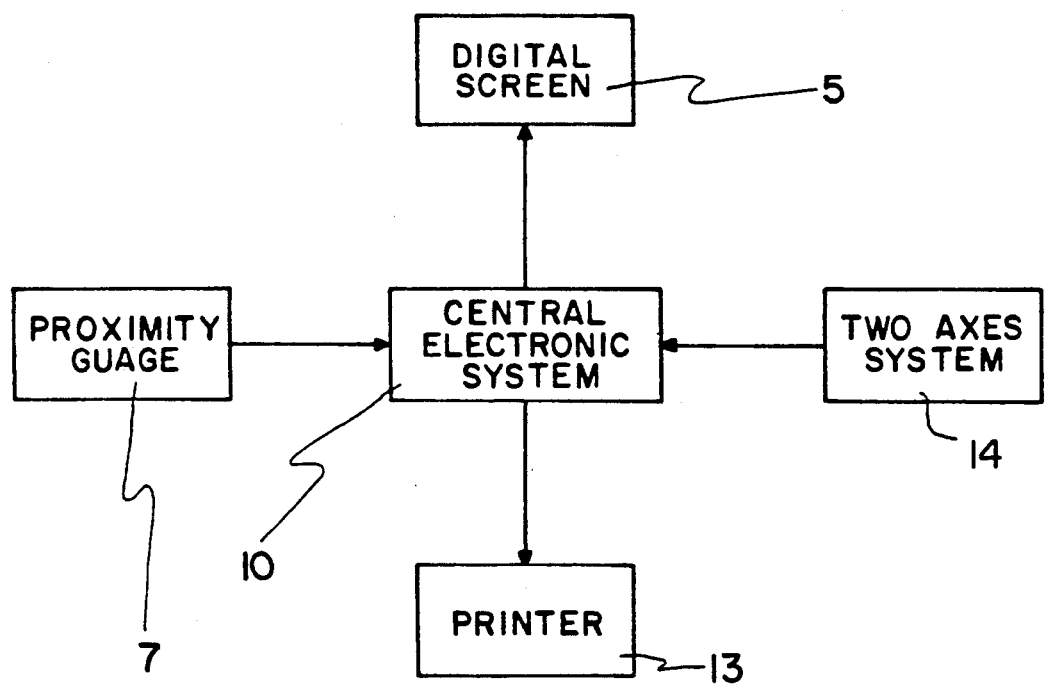
FIG. 5. Block diagram of the electronic control equipment.

In the diagrams represented in FIGS. 4 and 5 of the drawings, the block diagram that corresponds to the screen (5), the numerical control system (11), the coordinator (12) and the printer (13) and finally the block diagram of the electronic control equipment, where one sees the digital screen (5), the proximeter (7), the printer (13), the central control (10) and the two axes system, are represented respectively.

The equipment described verifies surfaces, calibrates dies, perforations, etc.

It can measure, count and control pieces with precision. It controls correction processes.

The development of the operation is the following:

Placement of the main guide over the surface to be verified.

The carriage displaces along the piece. In the run, at an adjustable constant speed, controlled by the central electronic control, the carriage slides the proximeter some centimeters of the surface to be verified.

Simultaneously the collimated laser transmitter and the two axes transmitter screen reflects the possible deviations of the guide and transmits them to the central control.

The central control effects the reading of the data provided by the proximeter and once they have been corrected with the compensations obtained from the coordinate system, a graph of the results is developed.

The control system operates by performing the following functions:

it translates the electrical signals into the corresponding magnitudes;

it performs compensations for correction of errors at each of the points where measurements are made;

it informs if the preliminary verification has given any error which cannot be corrected so that all further measurements are invalidated;

it states the information for each point and allows transmission thereof to data processing equipment or graphical representation equipment.

The control system reads the data given by the proximity gage, corrects the data on the grounds of the compensations of the system of coordinates, and develops a graphical representation of the results.

The difference of operation with other systems existing on the market of machines for verification of measurements is essential due to its operating principles:

Optical verification of deviation of the guide and electronic correction instead of mechanical correction.

Possibility of coupling to any type of mechanization or production.

Portability.

We claim:

1. An apparatus for verification of corrected surfaces or surfaces being corrected, said apparatus comprising:
    a displaceable carriage having an extendable arm;
    a horizontal alignment and displacement guide for the carriage;
    optical positioning reading means associated with the guide and including a proximity gage supported on the extendable arm and a collimated laser-transmitter;
    two vertical supports for supporting the alignment and displacement guide, the laser-transmitter being mounted on one of the two vertical supports for measuring a distance between the carriage and the one of the two vertical supports;
    a collapsible stop mounted on the extendable arm of the carriage for adjusting measurement margins of the proximity gage;
    a multiple sensor screen mounted on the carriage for cooperating with the laser-transmitter; and
    an electronic control system for processing the measuring data generated by the proximity gage and the laser-transmitter and for providing graphical representation of data obtained as a result of processing of the measuring data.

* * * * *